US011476697B2

(12) United States Patent
Yamaguchi et al.

(10) Patent No.: US 11,476,697 B2
(45) Date of Patent: Oct. 18, 2022

(54) BATTERY-CHARGING DEVICE

(71) Applicant: MAHLE ELECTRIC DRIVES JAPAN CORPORATION, Shizuoka-ken (JP)

(72) Inventors: Hirofumi Yamaguchi, Numazu (JP); Yuki Wakazuki, Numazu (JP); Ryuichiro Takahashi, Numazu (JP); Kazuo Matsuda, Numazu (JP)

(73) Assignee: MAHLE ELECTRIC DRIVES JAPAN CORPORATION, Shizuoka-ken (JP)

( * ) Notice: Subject to any disclaimer, the term of this patent is extended or adjusted under 35 U.S.C. 154(b) by 286 days.

(21) Appl. No.: 16/765,065

(22) PCT Filed: Nov. 29, 2017

(86) PCT No.: PCT/JP2017/042765
§ 371 (c)(1),
(2) Date: May 18, 2020

(87) PCT Pub. No.: WO2019/106744
PCT Pub. Date: Jun. 6, 2019

(65) Prior Publication Data
US 2020/0366123 A1 Nov. 19, 2020

(51) Int. Cl.
*H02J 7/28* (2006.01)
*H02M 7/219* (2006.01)

(52) U.S. Cl.
CPC ............... *H02J 7/28* (2013.01); *H02M 7/219* (2013.01)

(58) Field of Classification Search
None
See application file for complete search history.

(56) References Cited

U.S. PATENT DOCUMENTS 9,537,329 B2 * 1/2017 Pernyeszi ............. H02J 7/0014
10,491,030 B2 * 11/2019 Tian ........................ H02J 7/027
(Continued)

FOREIGN PATENT DOCUMENTS

| FR | 2950755 A1 | 4/2011 |
| JP | H04138030 A | 5/1992 |

(Continued)

OTHER PUBLICATIONS

International Search Report for PCT/JP2017/042765, dated Jan. 9, 2018.

*Primary Examiner* — Jeffrey A Gblende
(74) *Attorney, Agent, or Firm* — Pearne & Gordon LLP

(57) ABSTRACT

Provided is a battery-charging device that uses a full-bridge rectifier circuit in which each arm is composed of MOSFET as a circuit that rectifies an output of a magnet-type AC generator. The charging device comprises: an ON/OFF state establishment means that, on the basis of a polarity of a potential of each input terminal of the rectifier circuit, establishes ON/OFF state to be assumed by each MOSFET of the rectifier circuit when a battery is charged; a during-charging FET control means that performs control which matches the state of each MOSFET of the rectifier circuit with the state established by the ON/OFF state establishment means when the battery is charged; a short-circuit control means that performs short-circuit control which causes short-circuiting between output terminals of the generator when battery charging is paused; and a FET OFF means that generates a FET OFF time period in which all of the MOSFETs of the rectifier circuit assume an OFF state in a fixed cycle. While short-circuit control is being performed as well, information for establishing the states to be assumed by the MOSFETs of the rectifier circuit during battery charging can be obtained during the FET OFF time periods.

10 Claims, 10 Drawing Sheets

(56) References Cited

U.S. PATENT DOCUMENTS

2011/0074364 A1    3/2011  Nakajima et al.
2016/0144732 A1*   5/2016  Ramraika ............... B60L 53/20
                                                     320/109
2017/0187215 A1*   6/2017  Noda ...................... B60L 53/50

FOREIGN PATENT DOCUMENTS

| JP | H11225446   | 8/1999 |
| JP | 2002010694 A | 1/2002 |
| JP | 2005198426 A | 7/2005 |
| JP | 2011078216 A | 4/2011 |

* cited by examiner

FIG. 11

| A1 | A2 | A3 | F1 | F2 | F3 | F4 | F5 | F6 |
|----|----|----|-----|-----|-----|-----|-----|-----|
| 0 | 0 | 1 | ON | ON | OFF | OFF | OFF | ON |
| 0 | 1 | 0 | ON | OFF | ON | OFF | ON | OFF |
| 0 | 1 | 1 | ON | OFF | OFF | OFF | ON | ON |
| 1 | 0 | 0 | OFF | ON | ON | ON | OFF | OFF |
| 1 | 0 | 1 | OFF | ON | OFF | ON | OFF | ON |
| 1 | 1 | 0 | OFF | OFF | ON | ON | ON | OFF |

BATTERY-CHARGING DEVICE

TECHNICAL FIELD

The present invention relates to a battery-charging device that charges a battery by using a rectified output of a magnet-type AC generator.

BACKGROUND ART

A known example of a device that charges a battery is one configured such that the battery is charged by a rectified output of a magnet-type AC generator driven by an engine, a windmill, or another drive source.

This type of charging device is commonly configured from: a rectifier circuit that rectifies an output of a generator and supplies the output to a battery; a battery voltage detection circuit that detects voltage (battery voltage) at both ends of the battery; a charging necessity determination means that determines whether the battery needs to be charged or battery charging needs to be paused depending on the battery voltage detected by the detection circuit; and a control unit that controls the supply of the charging current to the battery so that a charging current is supplied to the battery through the rectifier circuit from the generator when it is determined by the charging necessity determination means that the battery needs to be charged, and the supply of the charging current to the battery is stopped when it is determined by the charging necessity determination means that the charging of the battery needs to be paused in order to prevent overcharging.

When a magnet-type AC generator is used as a power source that supplies a charging current to the battery, often the control unit is configured so that the output of the generator is rectified and a charging current is supplied to the battery when it is determined by the charging necessity determination means that the battery needs to be charged, and the supply of the charging current to the battery is stopped by short circuit control which causes a short circuit between output terminals of the generator when it is determined by the charging necessity determination means that the charging of the battery needs to be paused.

A diode-bridge full-wave rectifier circuit in which upper and lower arms of a bridge circuit are configured from diodes is widely used as a rectifier circuit that rectifies an output of a magnet-type AC generator. However, there is appreciable loss in the diodes when current flows in a forward direction; therefore, when the rectifier circuit is used, it is unavoidable that there will be appreciable power loss when the output of the generator is rectified. When there is appreciable power loss in the rectifier circuit, it is undesirable because not only does a temperature of the rectifier circuit increase, but it is also necessary to use a large generator in order to supply the necessary charging current to the battery.

As is indicated in Patent Document 1, a full-bridge, full-wave rectifier circuit in which each of upper arms and lower arms of a bridge circuit is configured from a MOSFET is proposed to be used as a rectifier circuit that rectifies an output of a generator. In a MOSFET, loss occurring in a main circuit (a circuit between a drain and a source) thereof when the MOSFET is set to ON is very small; therefore, when each of the arms of the rectifier circuit is configured from a MOSFET, the power loss occurring in the rectifier circuit can be reduced by controlling the MOSFET so that the current supplied from the generator to the battery through the rectifier circuit is flowed between the drain and source of the MOSFET constituting each arm of the rectifier circuit.

For the current supplied from the generator to the battery through the rectifier circuit to be delivered between the drain and source of the MOSFET constituting each arm of the rectifier circuit, it is preferable that the MOSFET be controlled so as to be set to ON when a polarity of a voltage applied between the drain and source of the MOSFET constituting each arm of the rectifier circuit from the generator is a polarity that biases in a forward direction a parasitic diode formed between the drain and source of the MOSFET constituting each of the arms. The polarity of the voltage applied between the drain and source of the MOSFET can be discerned by detecting a polarity of a potential of each of input terminals of the rectifier circuit.

For example, an ON state and an OFF state can be established as states to be respectively taken by the MOSFET of the upper arm and the MOSFET of the lower arm connected to each of the input terminals when the polarity of the potential of each of the input terminals of the rectifier circuit detected by an input potential polarity detection circuit is a polarity that applies a forward voltage to the parasitic diode of the MOSFET of the upper arm connected to each of the input terminals, and an OFF state and an ON state can be established as states to be respectively taken by the MOSFET of the upper arm and the MOSFET of the lower arm connected to each of the input terminals when the polarity of the potential of each of the input terminals of the rectifier circuit detected by the input potential polarity detection circuit is a polarity that applies a reverse voltage to the parasitic diode of the MOSFET of the upper arm connected to each of the input terminals.

When a full-bridge, full-wave rectifier circuit in which each arm of the bridge circuit is configured from a MOSFET is used as a full-bridge rectifier circuit that rectifies an output of a generator, a short circuit can be caused between output terminals of the generator by simultaneously setting the MOSFETs constituting the lower arms of the rectifier circuit to an ON state; therefore, when it is determined by the charging necessity determination means that battery charging needs to be paused, short-circuit control for stopping the supply of the charging current to the battery can be easily performed. For example, Patent Document 2 discloses causing a short circuit between the output terminals of the generator by simultaneously setting to an ON state the MOSFETs constituting the lower arms of the full-bridge rectifier circuit that rectifies the output of the magnet-type AC generator.

PRIOR ART DOCUMENTS

Patent Documents

[Patent Document 1] Japanese Laid-open Patent Application No. 4-138030

[Patent Document 2] Japanese Laid-open Patent Application No. 11-225446

DISCLOSURE OF THE INVENTION

Problems to be Solved by the Invention

As described above, when a full-bridge, full-wave rectifier circuit in which each of the upper arms and each of the lower arms are configured from MOSFETs is used as a rectifier circuit that rectifies an output of a generator, whether the states to be respectively taken by the MOSFETs of the upper arm and the lower arm connected to each input terminal of the rectifier circuit at each instant of time are an ON state or an OFF state can be established on the basis of a polarity of a potential of each input terminal of the rectifier circuit, the rectifier circuit having little power loss can be configured by performing control so as to match the states of the MOSFETs with the established states, and a battery can be charged with little loss.

However, in cases in which the MOSFETs constituting all of the lower arms of the rectifier circuit are simultaneously set to an ON state and short-circuit control of short-circuiting the output of the generator is performed when the battery voltage exceeds a specified voltage and it is determined that battery charging needs to be paused, the potential of the input terminals of the rectifier circuit is kept at zero potential while short-circuit control is being performed, and a problem is therefore encountered in that information for establishing the states to be assumed by the MOSFETs of the rectifier circuit at each instant of time can no longer be obtained.

Therefore, in the case of a configuration such as is described above, when short-circuit control is ended and battery charging is restarted, it is not possible to immediately establish which of the MOSFET of the upper arm and the MOSFET of the lower arm connected to each input terminal of the rectifier circuit is to be set to an ON state and which is to be set to an OFF state, and ON-OFF control of the MOSFETs during battery charging therefore cannot be quickly restarted. Therefore, with this type of battery-charging device, a transient time period occurs in which all of the MOSFETs are set to an OFF state in the procedure of ending short-circuit control and transitioning to during-charging control, and during this transient time period, a charging current is supplied to the battery through the full-wave rectifier circuit configured from the parasitic diodes of the MOSFETs and much heat is generated in the parasitic diodes in which much power is lost. When a battery to which a load is connected is charged, a state in which charging is needed and a state in which charging needs to be paused are sometimes repeated in a short cycle; therefore, there has been a problem in which, when a transient time period occurs in which a current flows through the parasitic diodes of the MOSFETs in the procedure of transitioning from short-circuit control to during-charging control, the temperature of the rectifier circuit excessively increases due to heat generated from the parasitic diodes in which much power is lost.

One considered approach to prevent the above-described problems from occurring involves separately providing a sensor that obtains a rotational angle position of a magnet rotor of a generator at each instant of time conjecturing a phase of a voltage applied to input terminals of a rectifier circuit from the rotational angle position information of the rotor obtained by the sensor, and on the basis of the phase information, establishing which of either upper or lower MOSFET connected to each input terminal of the rectifier circuit to be set to an ON state and which to be set to an OFF state. However, when there is a separately provided sensor that obtains the rotational angle position of the magnet rotor at each instant of time, it is unavoidable that the number of components constituting the charging device will be high and costs will rise.

An object of the present invention is to provide a battery-charging device that uses a full-bridge, full-wave rectifier circuit in which each arm of the bridge circuit is configured from a MOSFET as a rectifier circuit that rectifies an output of a magnet-type AC generator, wherein a sensor that detects a phase of an output voltage of the generator is not specially provided, information on a polarity of a potential of input terminals of the rectifier circuit can be obtained as needed even during short-circuit control, and control of the MOSFETs during charging can be quickly restarted after short-circuit control has been ended.

Means to Solve the Problems

The present invention is applied to a battery-charging device that charges a battery by using a rectified output of a magnet-type AC generator. The battery-charging device according to the present invention comprises a full-bridge rectifier circuit in which each of arms constituting a bridge circuit is composed of a MOSFET and which has input terminals to which an output of the generator is inputted and positive-side and negative-side output terminals connected respectively to a positive terminal and a negative terminal of the battery, a battery voltage detection circuit that detects a voltage across both ends of the battery, an input potential polarity detection circuit that detects a polarity of a potential of each input terminal of the rectifier circuit, and an FET control unit that controls the MOSFETs of the rectifier circuit in accordance with the detection outputs of the battery voltage detection circuit and the input potential polarity detection circuit.

In the present invention, the FET control unit is provided with a charging necessity determination means that determines whether the battery needs to be charged or battery charging needs to be paused on the basis of the voltage detected by the battery voltage detection circuit, an ON/OFF state establishment means that performs an ON/OFF state establishment process that on the basis of the polarity of the potential of each input terminal detected by the input potential polarity detection circuit, establishes whether the state to be assumed by each MOSFET of the rectifier circuit is an ON state or an OFF state when the output of the generator is rectified and supplied to the battery, a during-charging FET control means that performs during-charging FET control, which controls the state of each MOSFET of the rectifier circuit so as to match the state established by the ON/OFF state establishment means when the charging necessity determination means has determined that the battery needs to be charged, a short-circuit control means that performs short-circuit control, which simultaneously sets the MOSFETs constituting all of the upper arms of the rectifier circuit to an ON state or simultaneously sets the MOSFETs constituting all of the lower arms to an ON state to cause short-circuiting between the output terminals of the generator when the charging necessity determination means has determined that battery charging needs to be paused, and a FET OFF means that causes a FET OFF time period in which all of the MOSFETs of the rectifier circuit assume an OFF state to be generated in a set cycle at least when short-circuit control is performed. The ON/OFF state establishment means is configured so as to perform the ON/OFF state establishment process on the basis of the polarity of the potential of the input terminals of the rectifier circuit detected by the input potential polarity detection circuit during the FET OFF time periods, also while the short-circuit control means is performing short-circuit control.

As described above, when the FET OFF time period in which all of the MOSFETs of the rectifier circuit assume an OFF state is generated in a set cycle while short-circuit control is being performed, the polarity of the potential of each input terminal of the rectifier circuit can be detected during the FET OFF time periods also while short-circuit control is being performed; therefore, it is possible to establish which of the MOSFET of the upper arm and the MOSFET of the lower arm connected to each input terminal of the rectifier circuit is to be set to an ON state and which is to be set to an OFF state at each instant of time, and during-charging FET control can be quickly restarted after short-circuit control has been ended. Therefore, in the procedure of transitioning from short-circuit control to during-charging FET control, the heat generated in the parasitic diodes of the MOSFETs constituting the rectifier circuit can be reduced, and the temperature of the rectifier circuit can be prevented from excessively rising when short-circuit control is repeatedly performed.

As described above, when the FET OFF time period in which all of the MOSFETs of the rectifier circuit assume an OFF state is generated in a set cycle when short-circuit control is performed, short-circuiting between the output terminals of the generator is canceled during FET OFF time periods, and the output of the generator is therefore rectified by a full-wave rectifier circuit composed of the parasitic diodes of the MOSFETs constituting the rectifier circuit and supplied to the battery. Because FET OFF time periods repeatedly occur while short-circuit control is being performed, there is a risk that the battery will assume an overcharged state when the battery is charged by the generator output rectified by the full-wave rectifier circuit composed of the parasitic diodes of the MOSFETs during the FET OFF time periods.

Therefore, when the present invention is carried out, the length of the FET OFF time period is preferably set such that a power amount [Ws] outputted at each unit time from the generator through the parasitic diodes of the MOSFETs constituting the rectifier circuit while short-circuit control is being performed, is kept no higher than a minimum value of the power amount [Ws] which the battery must supply to the load at each unit time. When the FET OFF time period is set in this manner, all of the power outputted from the generator through the parasitic diodes of the MOSFETs of the rectifier circuit is supplied to the load of the battery during the FET OFF time period, there are no instances of power being supplied from the rectifier circuit to the battery, and the risk of the battery being brought to an overcharged state can therefore be eliminated.

The charging necessity determination means can be configured so as to determine that the battery needs to be charged when the battery voltage is equal to or less than a prescribed voltage, and determine that battery charging needs to be paused when the battery voltage exceeds the prescribed voltage. When the charging necessity determination means is configured in this manner, battery voltage is continuously detected, and when the necessity of charging is determined in accordance with battery voltage fluctuation, in a case in which the battery load fluctuates by a small amount, a state arises in which during-charging FET control and short-circuit control are switched in extremely short cycles in accordance with battery voltage fluctuation, and the rectifier circuit sometimes goes into an oscillatory state. When the rectifier circuit goes into an oscillatory state, the MOSFETs constituting the rectifier circuit are frequently switched between ON and OFF; therefore, a risk is presented in that the MOSFETs will overheat and become damaged due to switching loss occurring in the MOSFETs.

Therefore, according to another aspect of the present invention, a sampling timing generation means that generates a sampling timing in a fixed cycle is provided, and the charging necessity determination means is configured so as to sample the voltage detected by the battery voltage detection circuit only at the sampling timings generated by the sampling timing generation means, and determine whether the battery needs to be charged or battery charging needs to be paused on the basis of the sampled voltage.

When sampling timings are generated in a fixed cycle and the battery voltage is sampled only at the sampling timings to determine the necessity of battery charging as described above, control is fixed in either during-charging FET control or short-circuit control from each sampling timing until the next sampling timing; therefore, when the battery voltage fluctuates with high frequency, it is possible to prevent states in which short-circuit control and during-charging FET control are switched in short cycles in accordance with battery voltage fluctuation. Therefore, the rectifier circuit can be prevented from going into an oscillatory state, and the MOSFETs constituting the rectifier circuit can be prevented from being frequently switched between ON and OFF, and the MOSFETs can be prevented from being overheated due to switching loss.

Other aspects of the present invention are made clear in the description of the embodiments for carrying out the invention, written below.

Advantageous Effects of the Invention

According to the present invention, a FET OFF time period in which all of the MOSFETs of the rectifier circuit assume an OFF state is generated in a set cycle at least while short-circuit control is being performed, and the polarity of the potential of each input terminal of the rectifier circuit can be detected during the FET OFF time periods also while short-circuit control is being performed; therefore, while short-circuit control is being performed, it is possible to perform the ON/OFF state establishment process of establishing which of the MOSFET of the upper arm and the MOSFET of the lower arm connected to each input terminal of the rectifier circuit to be set to an ON state and which to be set to an OFF state. Therefore, according to the present invention, during-charging FET control can be quickly restarted after short-circuit control has been ended, battery charging can be restarted in a state in which the power loss occurring in the rectifier circuit will be reduced, and in the procedure of transitioning from short-circuit control to during-charging FET control, the time during which a current flows through the parasitic diodes of the MOSFETs constituting the rectifier circuit can be eliminated or appreciably shortened, and the temperature of the rectifier circuit can be prevented from excessively rising due to heat generated from the parasitic diodes in which power loss is appreciable.

In the present invention, when the sampling timing is generated in a fixed cycle and the charging necessity determination means is configured so as to sample the battery voltage only at the sampling timings and determine the necessity of battery charging on the basis of the sampled voltage, control is fixed in either during-charging FET control or short-circuit control from each sampling timing until the next sampling timing; therefore, when the battery voltage fluctuates with high frequency, it is possible to prevent states in which short-circuit control and during-charging FET control are switched in short cycles in accordance with battery voltage fluctuation, and the MOSFETs constituting the rectifier circuit can be prevented from being frequently switched between ON and OFF, and the MOSFETs can be prevented from being overheated due to switching loss.

BRIEF DESCRIPTION OF THE DRAWINGS

FIG. 11 is a chart of a structure of a table referenced by the microprocessor constituting the FET control unit when the microprocessor establishes whether each MOSFET of the rectifier circuit should be set to an ON state or to an OFF state in an embodiment of the present invention.

EMBODIMENTS FOR CARRYING OUT THE INVENTION

<Configuration of an Embodiment>

Figure 1:
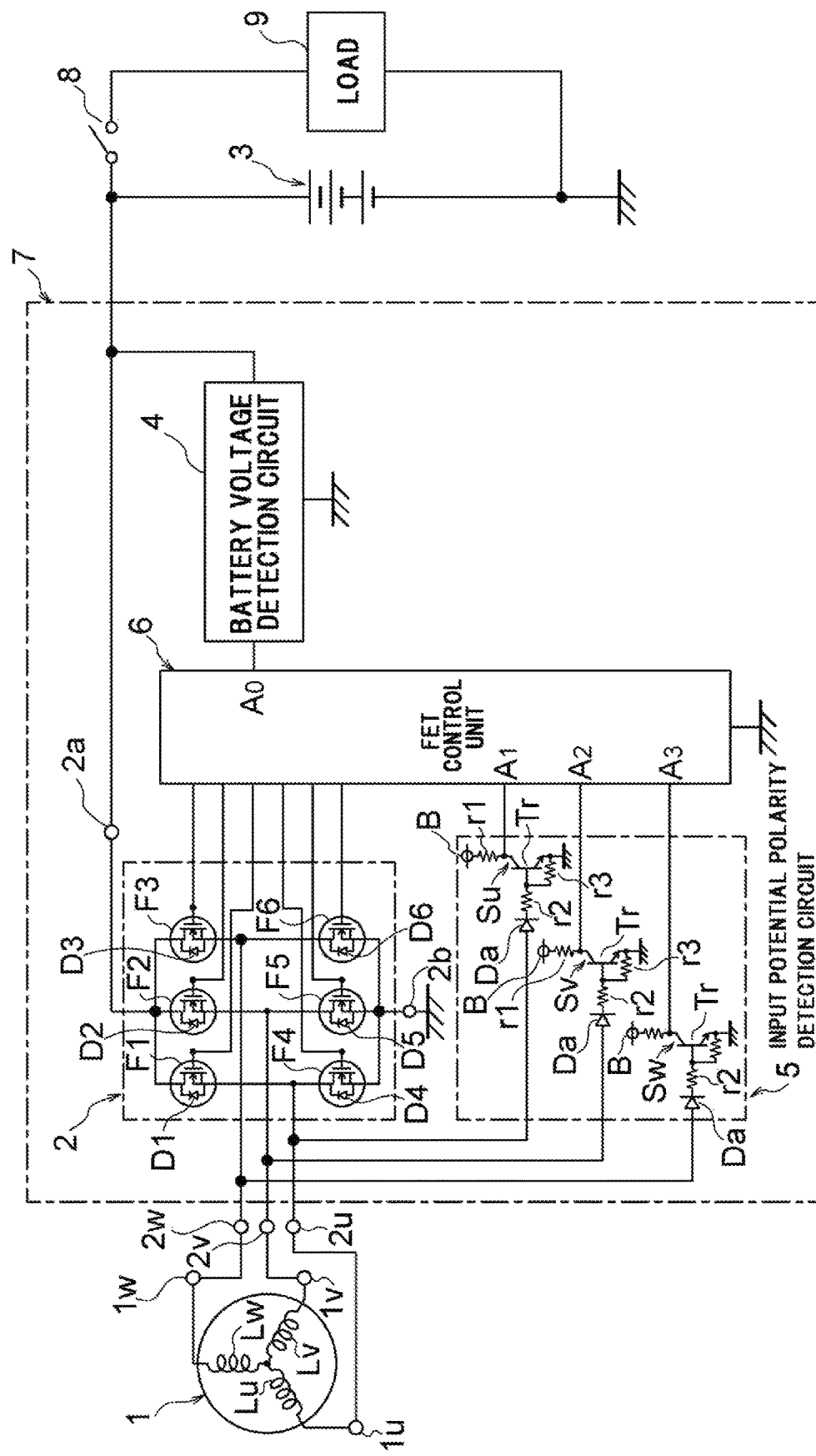
FIG. 1 is a circuit diagram of a configuration of an embodiment of the present invention.

Referring to FIG. 1, an overall configuration of one embodiment of a battery-charging device according to the present invention is shown. In this drawing, reference numeral 1 indicates a magnet-type AC generator rotatably driven by an engine, a windmill, or another motive power source, reference numeral 2 indicates a full-wave rectifier circuit that rectifies an output of the generator 1, and reference numeral 3 indicates a battery charged by an output of the rectifier circuit 2.

The generator 1 is configured from a magnet rotor rotatably driven by a motive power source, and a stator made by winding magneto coils Lu, Lv, and Lw of three phases U, V, and W each around an armature core having a magnetic pole part facing a magnetic pole of the magnet rotor. In the example shown in FIG. 1, the magneto coils Lu-Lw are connected in a star connection, and three output terminals $1u$, $1v$, and $1w$ are drawn out from non-neutral point sides of the magneto coils.

<Rectifier Circuit>

The rectifier circuit 2 is a full-bridge, three-phase, full-wave rectifier circuit in which each arm of a bridge circuit is configured from a MOSFET; the rectifier circuit 2 has three input terminals $2u$-$2w$, and a positive-side output terminal $2a$ and a negative-side output terminal $2b$. The rectifier circuit shown is configured from upper-arm MOSFETs F1-F3 of the three phases U, V, W of which sources are connected to the input terminals $2u$-$2w$ respectively and drains are connected to the same positive DC output terminal $2a$, and lower-arm MOSFETs F4-F6 of which drains are connected to the input terminals $2u$-$2w$ respectively and sources are connected to the same negative DC output terminal $2b$. The input terminals $2u$-$2w$ are respectively connected to the output terminals $1u$-$1w$ of the generator 1. The positive output terminal $2a$ of the rectifier circuit 2 is connected to a positive electrode terminal of the battery 3, and the negative output terminal $2b$ of the rectifier circuit 2 is connected with a negative electrode terminal of the battery 3.

In the rectifier circuit 2 used in the present embodiment, the full-bridge, three-phase, full-wave rectifier circuit is configured also from parasitic diodes D1-D6 formed between the drains and sources of the MOSFETs F1-F6, and a rectified output of the generator is supplied to the battery even when the MOSFETs F1-F6 have been set to OFF. In this case, the parasitic diodes D1-D6 suffer appreciable loss when current flows in a forward direction; therefore, when the rectifier circuit configured from the parasitic diodes D1-D6 is caused to perform a rectifying action of rectifying the output of the generator 1, a power loss accompanying the rectifying action is appreciable, and the battery 3 cannot be efficiently charged.

Therefore, according to the present embodiment, during a time period in which a forward voltage is applied to each of the parasitic diodes D1-D6 in the process of rectifying the output of the generator 1, the MOSFETs F1-F6 in which the respective parasitic diodes are formed are set to an ON state, and the rectifying action is performed while a current is flowed between the drains and sources of the MOSFETs F1-F6, whereby the power loss occurring in the rectifier circuit 2 is reduced.

In FIG. 1, reference numeral 4 indicates a battery voltage detection circuit that detects voltage (battery voltage) across both ends of the battery 3, reference numeral 5 indicates an input potential polarity detection circuit that detects a polarity of a potential of the three input terminals $2u$-$2w$ of the rectifier circuit 2, and reference numeral 6 indicates a FET control unit that controls the MOSFETs F1-F6 of the rectifier circuit in accordance with the output detected by the battery voltage detection circuit 4 and the output detected by the input potential polarity detection circuit 5. In the example shown in FIG. 1, a battery-charging device 7 is configured from the rectifier circuit 2, the battery voltage detection circuit 4, the input potential polarity detection circuit 5, and the FET control unit 6. A load 9 is connected through a switch 8 to both ends of the battery 3.

In the present embodiment, the battery 3 is installed in a machine driven by an engine, and electric components absolutely essential for activating the engine is included among loads driven by the battery 3. The electric components absolutely essential for activating the engine are, for example, an injector (fuel injection valve) that supplies fuel to the engine, a fuel pump that supplies fuel inside a fuel tank to the injector, an ignition device that ignites the engine, an electrical control unit (ECU) that controls the injector and the ignition device, etc. When a throttle valve of the engine is electronically controlled, an actuator that drives the throttle valve is also provided in addition to these components.

<Battery Voltage Detection Circuit>

The battery voltage detection circuit 4 is a circuit that generates an electric signal including information on the battery voltage, and is configured from, for example, a resistance voltage-dividing circuit that is connected in parallel to both ends of the battery 3, and that outputs a voltage proportionate to the battery voltage. The output of the battery voltage detection circuit 4 is inputted to a port $A_0$ of a microprocessor constituting the FET control unit 6. The microprocessor constituting the FET control unit 6 may be provided inside the ECU that controls the electric components of the engine or may be provided as being dedicated for the battery-charging device.

<Input Potential Polarity Detection Circuit>

The input potential polarity detection circuit 5 is provided in order to obtain information for establishing which MOSFETs of the rectifier circuit 2 are to be set to an ON state and which MOSFETs are to be set to an OFF state at each instant of time, when rectifier circuit 2 is caused to perform the action of rectifying the output of the generator 1. The input potential polarity detection circuit 5 shown is provided with polarity detection switches Su-Sw, which correspond respectively to the input terminals $2u$-$2w$ of the rectifier circuit and which have different ON/OFF states when there is a positive polarity of the potential of the input terminals $2u$-$2w$ relative to a potential (earth potential) of the negative terminal of the battery and when there is a negative polarity of the same. The input potential polarity detection circuit 5 is configured so as to detect, from the states of the polarity detection switches Su-Sw, whether the potential of the input terminals of the rectifier circuit has positive polarity or negative polarity.

Each of the polarity detection switches used in the example shown is composed of an NPN transistor Tr of which an emitter is grounded, a resistor r1 connecting a collector of the transistor Tr and an output terminal B of a constant-voltage DC power source (not shown), a resistor r2 of which one end is connected to a base of the transistor Tr, a diode Da having a cathode connected to another end of the resistor r2, and a resistor r3 connected between a base and an emitter of the transistor Tr, the bases of the respective transistors Tr of the polarity detection switches Su-Sw being connected through the diodes Da to the U-phase, V-phase, and W-phase input terminals $2u$, $2v$, and $2w$ of the rectifier circuit 2.

The polarity detection switches Su-Sw are set to an ON state by a base current sent to the respective transistors Tr when the polarity of the potential relative to the earth potential of the input terminals $2u$-$2w$ of the rectifier circuit 2 is positive, and are set to an OFF state when the polarity of the potential relative to the earth potential of the input terminals $2u$-$2w$ of the rectifier circuit 2 is negative or when the potential relative to the earth potential of the input terminals $2u$-$2w$ of the rectifier circuit 2 is less than a threshold value. The collectors of the respective transistors Tr of the polarity detection switches Su-Sw are connected to ports A1, A2, and A3 of the microprocessor constituting the FET control unit 6, and a binary signal that assumes either a low-level (L level or zero level) state or a high-level (H level) state is sent from the polarity detection switches Su-Sw to the respective ports A1-A3.

When the polarity of the potential of the input terminals $2u$-$2w$ of the rectifier circuit 2 is positive and the polarity detection switches Su-Sw are in an ON state, an L level signal is inputted to the ports A1, A2, and A3 of the microprocessor constituting the FET control unit 6, and when the polarity of the potential of the input terminals $2u$-$2w$ of the rectifier circuit 2 is negative and the polarity detection switches Su-Sw are in an OFF state, an H level signal is inputted to the ports A1-A3 of the microprocessor constituting the FET control unit 6. In the present embodiment, the L level signal corresponds to the binary numeral "0," and the H level signal corresponds to the binary numeral "1."

<FET Control Unit>

Figure 2:
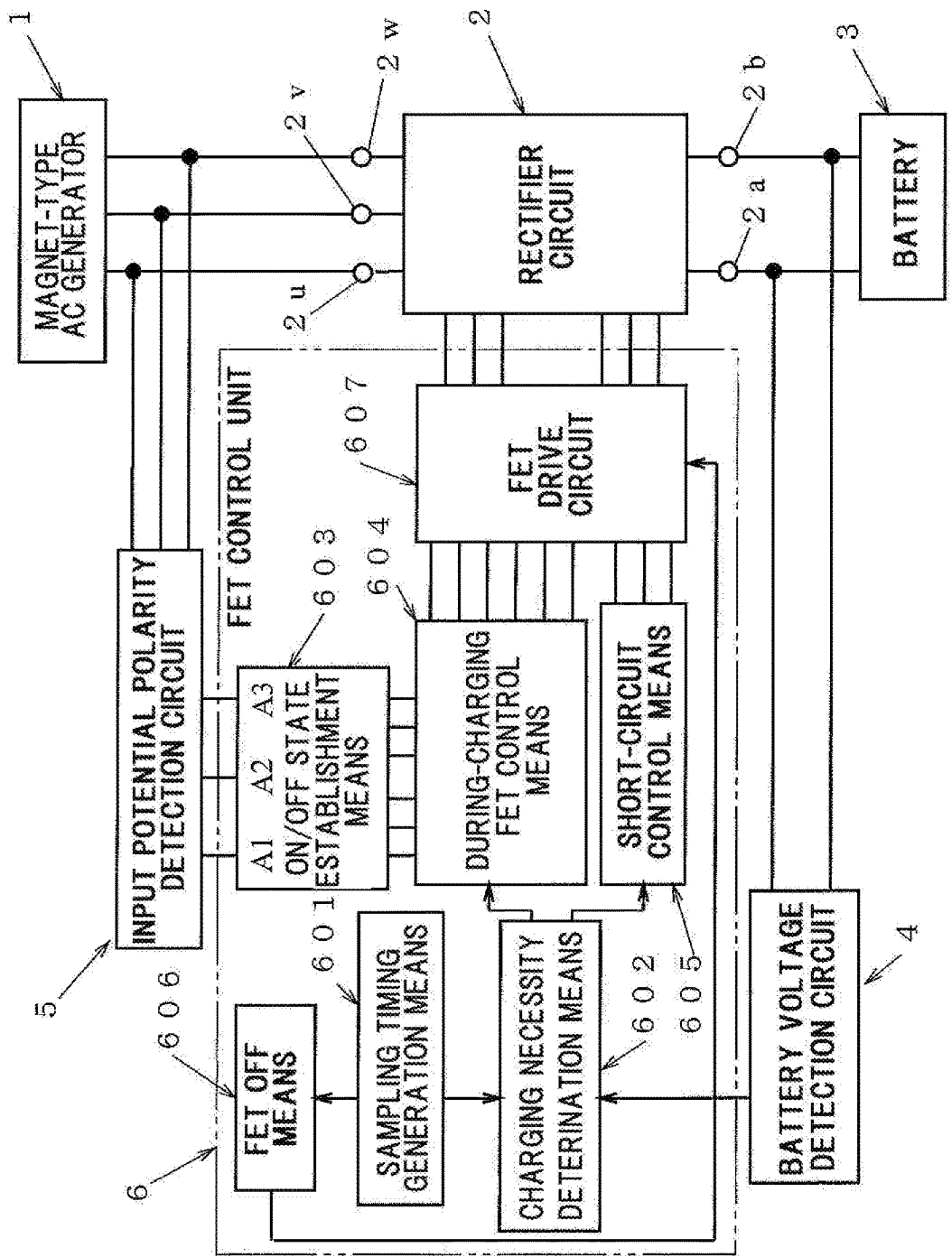
FIG. 2 is a block diagram of a configuration example of a FET control unit used in the embodiment of FIG. 1.

As shown in FIG. 2, the FET control unit 6 used in the present embodiment is provided with a sampling timing generation means 601, a charging necessity determination means 602, an ON/OFF state establishment means 603, a during-charging FET control means 604, a short-circuit control means 605, a FET OFF means 606, and a FET drive circuit 607.

The sampling timing generation means 601 is a means that generates a sampling timing in a fixed cycle. The sampling timing generation means 601 may be configured from a means that performs a process of establishing sampling timings on the basis of a clock pulse generated within the microprocessor, and may be composed of an oscillator that in a fixed sampling cycle generates a sampling pulse instructing that designated data be sampled.

The charging necessity determination means 602 is a means that determines whether or not the battery 3 needs to be charged, and is configured so as to determine whether the battery 3 needs to be charged or charging of the battery 3 needs to be paused on the basis of the voltage detected by the battery voltage detection circuit 4. The charging necessity determination means 602 can be configured, for example, so as to determine that the battery 3 needs to be charged when the battery voltage detected by the battery voltage detection circuit 4 is equal to or less than a prescribed voltage, and to determine that the charging of the battery 3 needs to be paused when the battery voltage detected by the battery voltage detection circuit 4 exceeds the prescribed voltage.

The charging necessity determination means 602 used in the present embodiment is configured so as to sample the voltage detected by the battery voltage detection circuit 4 only at the sampling timings generated by the sampling timing generation means 601, determine that the battery needs to be charged when the sampled voltage is equal to or less than a prescribed voltage, and determine that the charging of the battery needs to be paused when the sampled voltage exceeds the prescribed voltage.

The ON/OFF state establishment means 603 is a means that performs an ON/OFF state establishment process of establishing, on the basis of the polarity of the potential of the input terminals $2u$-$2w$ detected by the input potential polarity detection circuit 5, whether the state to be taken by the MOSFETs of the rectifier circuit 2 is an ON state or an OFF state at different timings in order to minimize the power loss that occurs in the rectifier circuit 2 when the output of the generator 1 is rectified and supplied to the battery 3.

The ON/OFF state establishment means 603 used in the present embodiment is configured so as to establish the states respectively taken by the upper-arm MOSFET and the lower-arm MOSFET connected to each of the input terminals of the rectifier circuit 2 as an ON state and an OFF state when the polarity of the potential of each input terminal detected by the input potential polarity detection circuit 5 is a polarity (positive polarity) that applies forward voltage to the parasitic diode of the upper-arm MOSFET connected to each of the input terminals, and to establish the states respectively taken by the upper-arm MOSFET and the lower-arm MOSFET connected to each of the input terminals of the rectifier circuit 2 as an OFF state and an ON state when the polarity of the potential of each input terminal detected by the input potential polarity detection circuit 5 is a polarity (negative polarity) that applies reverse voltage to the parasitic diodes of the upper-arm MOSFET connected to each input terminal.

To describe in further detail, the ON/OFF state establishment means 603 used in the present embodiment establishes that between the MOSFETs constituting the upper arm and the lower arm connected to the U-phase input terminal 2u of the rectifier circuit, the state to be taken by the MOSFET F1 constituting the upper arm and the state to be taken by the MOSFET F4 constituting the lower arm are respectively an ON state and an OFF state when the potential of the input terminal 2u has positive polarity, and between the MOSFETs constituting the upper arm and the lower arm connected to the U-phase input terminal 2u of the rectifier circuit, the state to be taken by the MOSFET F1 constituting the upper arm and the state to be taken by the MOSFET F4 constituting the lower arm are respectively an OFF state and an ON state when the potential of the input terminal 2u has negative polarity.

The ON/OFF state establishment means 603 used in the present embodiment also establishes that between the MOSFETs constituting the upper arm and the lower arm connected to the V-phase input terminal 2v of the rectifier circuit, the state to be taken by the MOSFET F2 constituting the upper arm and the state to be taken by the MOSFET F5 constituting the lower arm are respectively an ON state and an OFF state when the potential of the input terminal 2v has positive polarity, and between the MOSFETs constituting the upper arm and the lower arm connected to the V-phase input terminal 2v of the rectifier circuit, the state to be taken by the MOSFET F2 constituting the upper arm and the state to be taken by the MOSFET F5 constituting the lower arm are respectively an OFF state and an ON state when the potential of the input terminal 2v has negative polarity.

The ON/OFF state establishment means 603 used in the present embodiment also establishes that between the MOSFETs constituting the upper arm and the lower arm connected to the W-phase input terminal 2w of the rectifier circuit, the state to be taken by the MOSFET F3 constituting the upper arm and the state to be taken by the MOSFET F6 constituting the lower arm are respectively an ON state and an OFF state when the potential of the input terminal 2w has positive polarity, and between the MOSFETs constituting the upper arm and the lower arm connected to the W-phase input terminal 2w of the rectifier circuit, the state to be taken by the MOSFET F3 constituting the upper arm and the state to be taken by the MOSFET F6 constituting the lower arm are respectively an OFF state and an ON state when the potential of the input terminal 2w has negative polarity.

FIG. 11 shows a table showing a relationship between binary signals (0 or 1) inputted to the ports A1, A2, and A3 of the microprocessor constituting the FET control unit 6 and the states (ON states or OFF states) of the MOSFETs constituting the rectifier circuit 2. This table is stored in ROM of the microprocessor.

The ON/OFF state establishment means 603 reads the binary signals inputted from the input potential polarity detection circuit 5 to the ports A1, A2, and A3 at the sampling timings generated by the sampling timing generation means 601, and every time the ON/OFF state establishment means 603 reads the binary signals inputted to the ports A1, A2, and A3, the ON/OFF state establishment means 603 establishes which of the MOSFETs F1-F6 constituting the rectifier circuit 2 to set to an ON state and which of the MOSFETs F1-F6 to set to an OFF state by referencing the table shown in FIG. 11.

The microprocessor causes either the during-charging FET control means 604 or the short-circuit control means 605 to perform a control action in accordance with the result of the determination made by the charging necessity determination means 602. The during-charging FET control means 604 is a means that performs during-charging FET control so as to match the respective states of the MOSFETs F1-F6 of the rectifier circuit 2 with the states established by the ON/OFF state establishment means 603 when it has been determined by the charging necessity determination means 602 that the battery 3 needs to be charged. The short-circuit control means 605 is a means that performs short-circuit control in which the MOSFETs F1-F3 constituting all of the upper arms of the rectifier circuit 2 are simultaneously set to an ON state or the MOSFETs F4-F6 constituting all of the lower arms are simultaneously set to an ON state and a short circuit is caused between the output terminals of the generator 1 when it has been determined by the charging necessity determination means 602 that the charging of the battery 3 needs to be paused.

The short-circuit control means 605 used in the present embodiment is configured so as to perform short-circuit control in which a short circuit is caused between the output terminals of the generator 1 by simultaneously setting the MOSFETs F4-F6 constituting all of the lower arms of the rectifier circuit 2 to an ON state when it has been determined by the charging necessity determination means 602 that the charging of the battery 3 needs to be paused.

When short-circuit control is performed in a prior-art battery-charging device, short circuiting is caused between the output terminals 1u-1v of the generator 1, between 1v-1w, and between 1w-1u, and the potential detected by the input potential polarity detection circuit 5 is kept at 0; therefore, it has not been possible to obtain the information needed to establish which of the MOSFETs F1-F6 of the rectifier circuit are to be set to an ON state and which of the MOSFETs F1-F6 of the rectifier circuit are to be set to an OFF state in order to rectify the output of the generator and supply the output to the battery. When information for establishing which of the MOSFETs F1-F6 of the rectifier circuit are to be set to an ON state and which are to be set to an OFF state is not obtained when during-charging FET control is performed while short-circuit control is being performed, it is not possible to establish the ON/OFF states to be immediately taken by the MOSFETs F1-F6 when short-circuit control is ended and during-charging FET control is restarted, and a problem is therefore encountered in which the restarting of during-charging FET control is delayed, during which time a current flows through the rectifier circuit configured by the parasitic diodes of the MOSFETs, and appreciable loss occurs.

To prevent such a problem from occurring, in the present embodiment, the FET OFF means 606 is provided, which stops the supply of a drive signal to all of the MOSFETs F1-F6 of the rectifier circuit 2 at least when short-circuit control is performed and causes to generate a FET OFF time period in which these MOSFETs are in an OFF state, in a set cycle. The FET OFF means 606 may be configured so as to cause there to be a FET OFF time period only during short-circuit control, but in the present embodiment, the FET OFF means 606 is configured so as to cause to generate a FET OFF time period in which all of the MOSFETs F1-F6 of the rectifier circuit 2 are in an OFF state within a set cycle when during-charging FET control is performed as well.

The FET OFF means 606 may be configured so as to cause to generate a FET OFF time period at a timing separate from the sampling timing generated by the sampling timing generation means, but in the present embodiment, to simply control, the FET OFF means 606 is configured so as to cause there to be a FET OFF time period in which all of the MOSFETs F1-F6 constituting the rectifier circuit are set to an OFF state at the sampling timings generated by the sampling timing generation means 601, both when during-charging FET control is performed and when short-circuit control is performed.

The FET OFF time period generated by the FET OFF means 606 may be a time period always representing a fixed length of time, or it may be a time period that starts at a timing arriving in a fixed cycle and that ends when the ON/OFF state establishment means acquires information needed to establish the ON/OFF states of the MOSFETs F1-F6 of the rectifier circuit, or a time period that starts at a timing arriving in a fixed cycle and that ends at the point when the ON/OFF state establishment means completes an ON/OFF state establishment process for establishing the ON/OFF states of the MOSFETs F1-F6 of the rectifier circuit.

When a FET OFF time period $\Delta t$ in which all of the MOSFETs F1-F6 of the rectifier circuit 2 are in an OFF state at least during short-circuit control is generated in a set cycle, the polarity of the potential of the input terminals of the rectifier circuit 2 can be detected during the FET OFF time periods and the ON/OFF state establishment process of establishing the states to be assumed by the MOSFETs of the rectifier circuit when the output of the generator is rectified and supplied to the battery can be performed even while short-circuit control is being performed; therefore, during-charging FET control can be quickly restarted after short-circuit control has been ended.

The FET drive circuit 607 is a circuit that sends drive signals to gates of the MOSFETs F1-F6 constituting the rectifier circuit 2; this circuit sends drive signals to the gates of the MOSFETs F1-F6 constituting the rectifier circuit 2 so that the MOSFETs are set to ON or OFF at designated timings in accordance with commands sent from the during-charging FET control means 604, the short-circuit control means 605, and the FET OFF means 606.

Among the constituent elements of the FET control unit 6 shown in FIG. 2, the charging necessity determination means 602, the ON/OFF state establishment means 603, the during-charging FET control means 604, the short-circuit control means 605, and the FET OFF means 606 are configured by causing the microprocessor to execute designated programs. The sampling timing generation means 601 may be configured by causing the microprocessor to execute a designated program, or may be configured from a pulse oscillator.

<Explanation of Operation>

Figure 6:
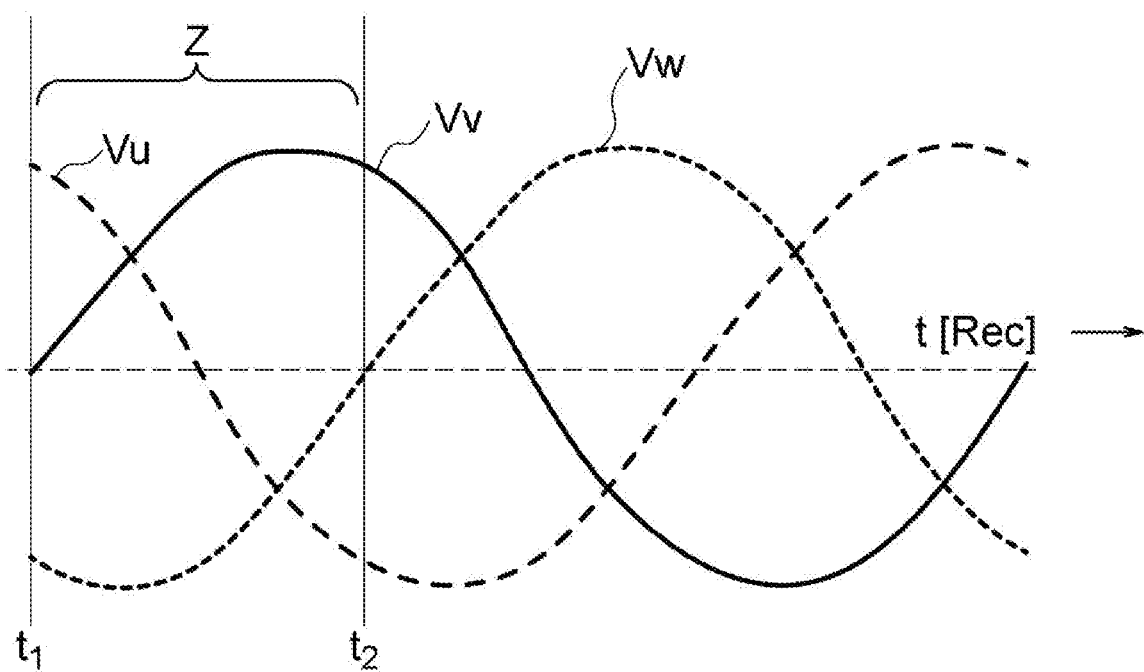
FIG. 6 is a waveform chart of a waveform of a three-phase AC voltage outputted by a magnet-type AC generator used in an embodiment of the present invention.

The magnet-type AC generator 1 used in the present embodiment outputs three-phase AC voltages Vu, Vv, Vw of the phases U, V, and W as shown in FIG. 6. The battery-charging device 7 performs during-charging FET control and supplies the rectified output of the generator 1 to the battery 3 when the battery voltage is equal to or less than a prescribed voltage and the charging necessity determination means 602 determines that the battery 3 needs to be charged. When the battery voltage exceeds the prescribed voltage and the charging necessity determination means 602 determines that the charging of the battery 3 needs to be paused in order to prevent overcharging of the battery 3, short-circuit control is performed in which short-circuiting is caused between the output terminals of the generator by simultaneously setting the MOSFETs F4-F6 to an ON state, and the supply of a charging current from the generator 1 to the battery 3 is stopped. These controls are described below.

<During-Charging FET Control>

Figure 7:
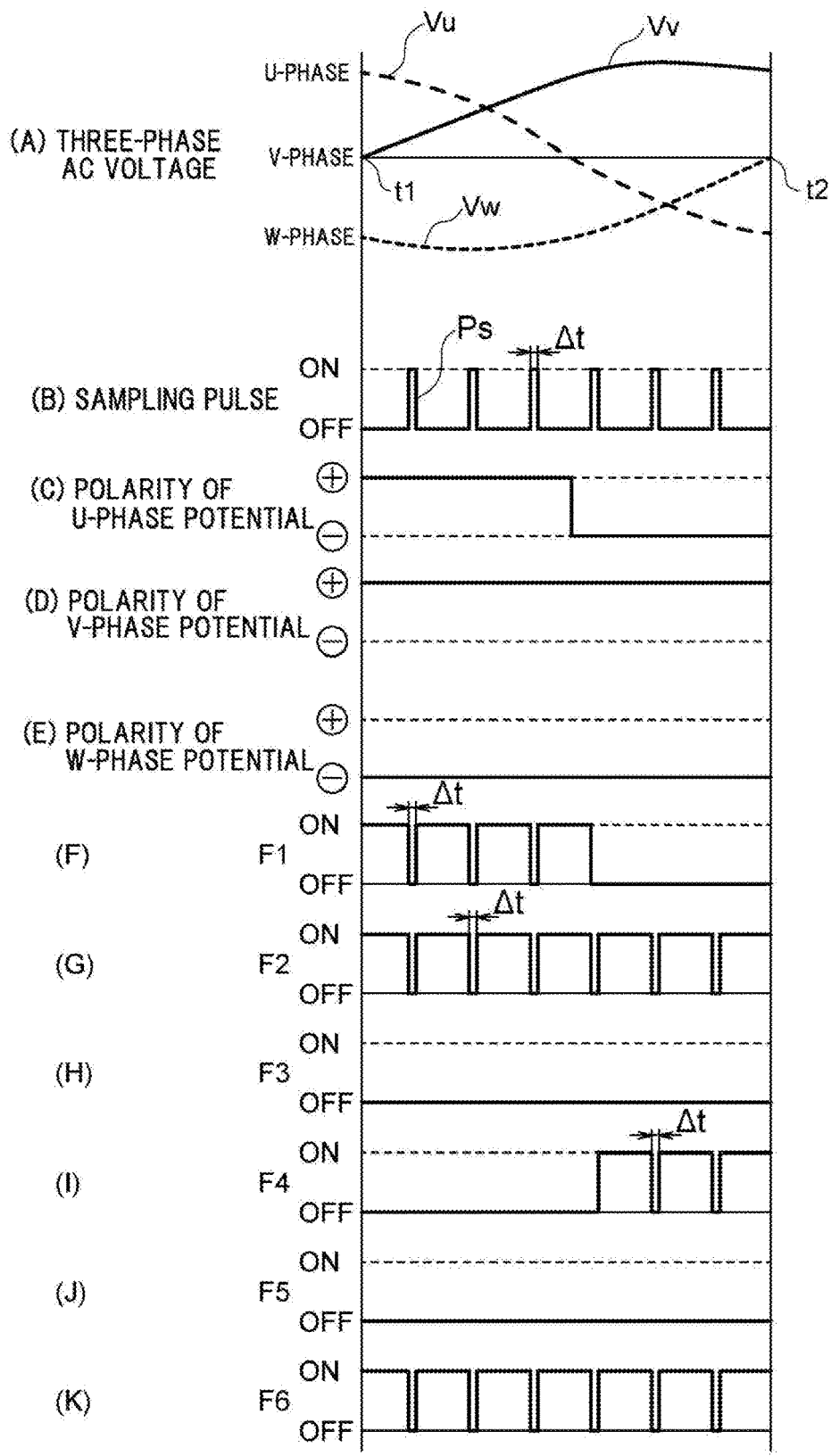
FIGS. 7(A) to (K) is a waveform chart of voltage waveforms which appear at various parts when during-charging FET control is performed in the embodiment of FIG. 1.
Figure 8:
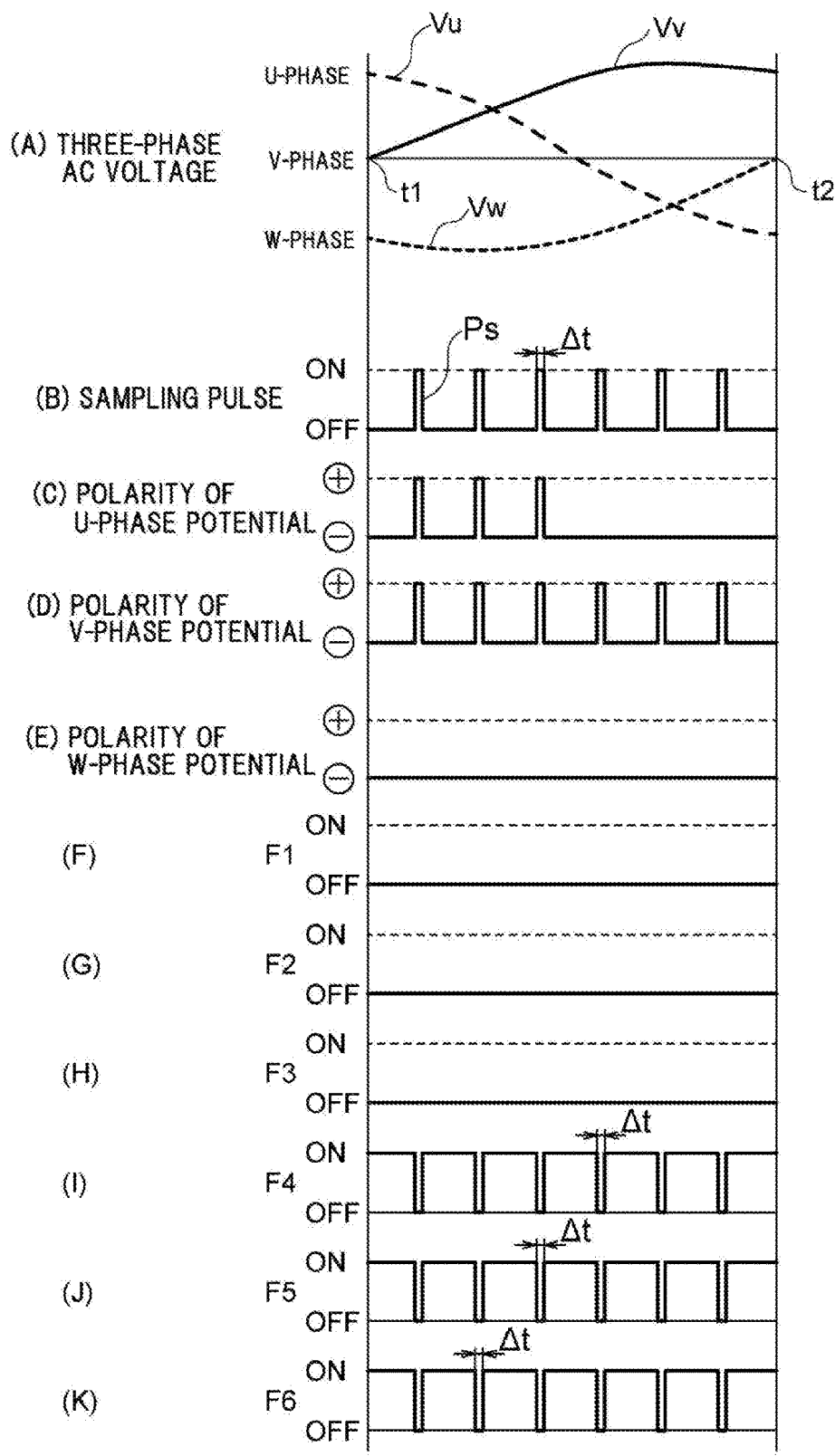
FIGS. 8(A) to (K) is a waveform chart of voltage waveforms which appear at various parts when short-circuit control is performed in the embodiment of FIG. 1.

Referring to FIG. 7, voltage waveforms which appear at various parts when during-charging FET control is performed are shown, and referring to FIG. 8, voltage waveforms which appear at various parts when short-circuit control is performed are shown. In FIGS. 7 and 8, (A) shows enlarged waveforms from section Z between times t1 and t2 of the three-phase AC voltage shown in FIG. 6, and (B) shows a sampling pulse Ps outputted in order for the sampling timing generation means 601 to generate a sampling timing in a fixed cycle. (C) through (E) respectively show polarities of the potentials of the U-phase to W-phase input terminals $2u$ to $2w$ of the rectifier circuit 2 detected by the input potential polarity detection circuit 5, and (F) through (K) respectively show the ON/OFF states of the MOSFETs F1-F6 constituting the rectifier circuit 2.

The microprocessor reads the battery voltage detected by the battery voltage detection circuit 4 every time the sampling pulse Ps is generated and determines whether the read battery voltage is equal to or less than the prescribed voltage or exceeds the prescribed voltage. Through this determination, it is determined that the battery needs to be charged when the battery voltage is determined to be equal to or less than the prescribed voltage, and it is determined that battery charging needs to be paused in order to prevent overcharging when the battery voltage is determined to exceed the prescribed voltage.

In the section where the output voltage of the generator 1 exhibits the waveform of FIG. 7(A), the potential of the U-phase input terminal $2u$ of the rectifier circuit 2 has positive polarity as shown in (C) where the U-phase output voltage of the generator 1 is in a positive half-wave, and the potential of the U-phase input terminal $2u$ of the rectifier circuit 2 has negative polarity where the U-phase output voltage of the generator 1 is in a negative half-wave. In the section shown in FIG. 7(A), the potential of the V-phase input terminal $2v$ of the rectifier circuit 2 has positive polarity as shown in FIG. 7(D) because the V-phase output voltage of the generator 1 is in a positive half-wave, and the potential of the W-phase input terminal $2w$ of the rectifier circuit has negative polarity as shown in FIG. 7(E) because the W-phase output voltage of the generator 1 is in a negative half-wave.

The ON/OFF state establishment means 603 configured by a microprocessor reads the detected output of the input potential polarity detection circuit 5 inputted to the ports A1-A3 at the sampling timings, and establishes which MOSFET of the upper arm and MOSFET of the lower arm connected to each of the input terminals of the rectifier circuit 2 is to be set to an ON state and which MOSFET of the upper arm and the lower arm connected to each of the input terminals of the rectifier circuit 2 is to be set to an OFF state by referring to the table of FIG. 11. The during-charging FET control means 604 sends drive signals to the designated MOSFETs of the rectifier circuit so as to match the ON/OFF states of the MOSFET of the upper arm and MOSFET of the lower arm connected to each of the input terminals of the rectifier circuit 2 with the states established by the ON/OFF state establishment means 603.

Every time the sampling timing generation means 601 generates sampling timings, the FET OFF means 606 used in the present embodiment designates times equivalent to pulse widths of the sampling pulses as FET OFF time periods $\Delta t$ and sets all of the MOSFETs of the rectifier circuit to an OFF state during the FET OFF time periods $\Delta t$.

When the battery is charged in the section shown in FIG. 7 and while the potential of the U-phase input terminal $2u$ of the rectifier circuit has positive polarity, the MOSFET F1 of the upper arm connected to the input terminal $2u$ is set to an ON state as shown in FIG. 7(F), and the MOSFET F4 of the lower arm connected to the input terminal $2u$ is set to an OFF state as shown in FIG. 7(I). While the potential of the U-phase input terminal 2u has negative polarity, the MOSFET F1 of the upper arm connected to the input terminal 2u is set to an OFF state and the MOSFET F4 of the lower arm connected to the input terminal 2u is set to an ON state.

When the battery is charged in the section shown in FIG. 7, because the potential of the V-phase input terminal 2v of the rectifier circuit has positive polarity as shown in FIG. 7(D), the MOSFET F2 of the upper arm connected to the input terminal 2v of the rectifier circuit is set to an ON state as shown in FIG. 7(G), and the MOSFET F5 of the lower arm connected to the input terminal 2v is set to an OFF state as shown in FIG. 7(J). Because the potential of the W-phase input terminal of the rectifier circuit has negative polarity as shown in FIG. 7(E), the MOSFET F3 of the upper arm connected to the input terminal 2w is set to an OFF state as shown in FIG. 7(H), and the MOSFET F6 of the lower arm connected to the input terminal 2w is set to an ON state as shown in FIG. 7(K).

In the present embodiment, also when during-charging FET control is performed, the FET OFF means 606 stops the supply of drive signals to all of the MOSFETs F1-F6 of the rectifier circuit during the FET OFF time period Δt and sets all of the MOSFETs to an OFF state every time the sampling timing generation means 601 generates the sampling pulse shown in FIG. 7(B) to generate a sampling timing. Therefore, MOSFETs set to an ON state on the basis of the establishment made by the ON/OFF state establishment means 603 when during-charging FET control is performed are set to an OFF state during the fixed FET OFF time period Δt every time the sampling timings arrive.

Figure 3:
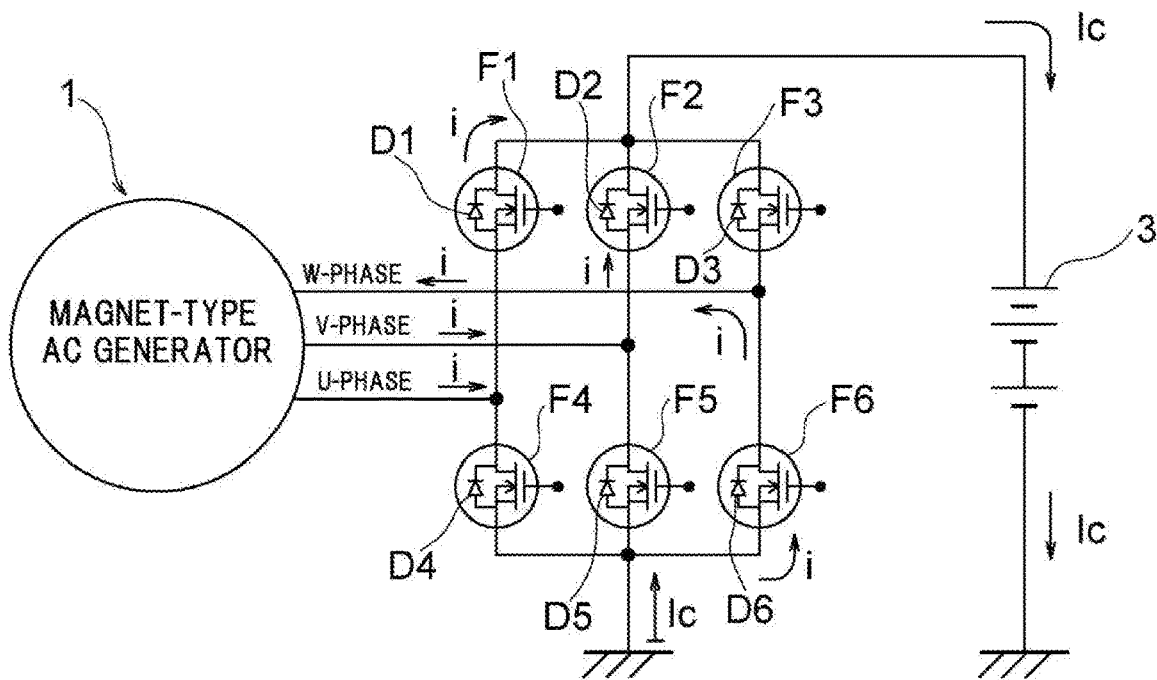
FIG. 3 is a circuit diagram for illustrating an action of a rectifier circuit when during-charging FET control is performed in an embodiment of the present invention.

When during-charging FET control is performed, a current i flows to each MOSFET of the rectifier circuit 2 and a charging current Ic is supplied to the battery 3 as shown by the arrows in FIG. 3.

In cases such as the present embodiment in which the charging necessity determination means is configured so as to determine that the battery needs to be charged when the battery voltage is equal to or less than a prescribed voltage and to determine that battery charging needs to be paused when the battery voltage exceeds the prescribed voltage, battery voltage is continuously detected, and when the necessity of charging is determined in accordance with battery voltage fluctuation, in a case in which the battery load fluctuates with high frequency and battery voltage fluctuates frequently, during-charging FET control and short-circuit control are switched in extremely short cycles, the rectifier circuit 2 goes into an oscillatory state, and there is a risk that the MOSFETs constituting the rectifier circuit will overheat and become damaged due to switching loss. To prevent such a problem from occurring, the charging necessity determination means must be configured so as to determine that battery charging needs to be paused when the battery voltage exceeds a first prescribed voltage and to determine that the battery needs to be charged when the battery voltage is equal to or less than a second prescribed voltage set to a lower value than the first prescribed voltage, and a means that, inter alfa, maintains hysteresis in the actions of the battery-charging device must be contrived.

To address this, when sampling timings are generated in a fixed cycle and the battery voltage is sampled only at the sampling timings to determine the necessity of battery charging as in the present embodiment, control is fixed in either during-charging FET control or short-circuit control from each sampling timing until the next sampling timing; therefore, when the battery voltage fluctuates with high frequency, it is possible to prevent occurrence of states in which short-circuit control and during-charging FET control are switched in short cycles in accordance with battery voltage fluctuation, and the MOSFETs constituting the rectifier circuit are frequently switched between ON and OFF. Whereby, it is possible to prevent the MOSFETs from being overheated due to switching loss.

When sampling timings are generated in a fixed cycle and the charging necessity determination means is configured so as to detect the battery voltage only at the sampling timings and determine the necessity of battery charging as in the present embodiment, battery voltage fluctuation can no longer be appropriately detected when a sampling cycle is too long, and battery charging cannot longer be appropriately controlled. In cases in which a FET OFF time period is generated in a fixed cycle as in the present embodiment (a sampling cycle in the present embodiment), when the cycle in which the FET OFF time period is generated is too short, short-circuit control can no longer be appropriately performed because the FET OFF time period occurs frequently. The cycle in which the sampling timing generation means 601 generates a sampling timing is set, on the basis of test results, to a length such that battery charging control can be appropriately performed and short-circuit control is not hindered. In the case of charging a battery that drives electric components needed to activate an engine, it is confirmed by testing that it is suitable for the sampling cycle to be set to, for example, about 125 μsec.

The FET OFF time period may be fixed, it may be a time period that is started in a fixed cycle and that always represents a fixed length, or it may be a time period that starts at a timing arriving in a fixed cycle and that ends when the ON/OFF state establishment means acquires information needed to establish the ON/OFF states of the MOSFETs F1-F6 of the rectifier circuit, or a time period that starts at a timing arriving in a fixed cycle and that ends at the point when the ON/OFF state establishment means completes an ON/OFF state establishment process for establishing the ON/OFF states of the MOSFETs F1-F6 of the rectifier circuit, but in the example shown in FIGS. 7 and 8, a fixed time period Δt equivalent to the pulse width of the sampling pulse Ps is designated as the FET OFF time period.

<Short-Circuit Control>

When the charging necessity determination means 602 determines that battery charging needs to be paused, the short-circuit control means 605 performs short-circuit control in which either the MOSFETs F1-F3 constituting all of the upper arms of the rectifier circuit 2 are simultaneously set to an ON state or the MOSFETs F4-F6 constituting all of the lower arms are simultaneously set to an ON state, and short-circuiting is caused between the output terminals 1u and 1v of the generator, between 1v and 1w, and between 1w and 1u.

In the present embodiment, short-circuit control is performed in which short-circuiting is caused between the output terminals of the generator by simultaneously setting the MOSFETs F1-F3 constituting all of the upper arms of the rectifier circuit 2 to an OFF state and simultaneously setting the MOSFETs F4-F6 constituting all of the lower arms to an ON state as shown in FIGS. 8(F) through (H). While the MOSFETs F4-F6 are simultaneously set to an ON state and short-circuit control is being performed, the FET OFF means 606 performs FET OFF control in which all of the MOSFETs of the rectifier circuit 2 are set to an OFF state during a fixed FET OFF time period Δt at the sampling timings, and the MOSFETs F4-F6 are therefore cyclically set to an OFF state as seen in FIGS. 8(I) through (K). The ON/OFF state establishment means 603 is provided to perform the ON/OFF state establishment process during the FET OFF time periods Δt in preparation for restart of the during-charging FET control, also while the short-circuit control means 605 is performing short-circuit control.

Figure 4:
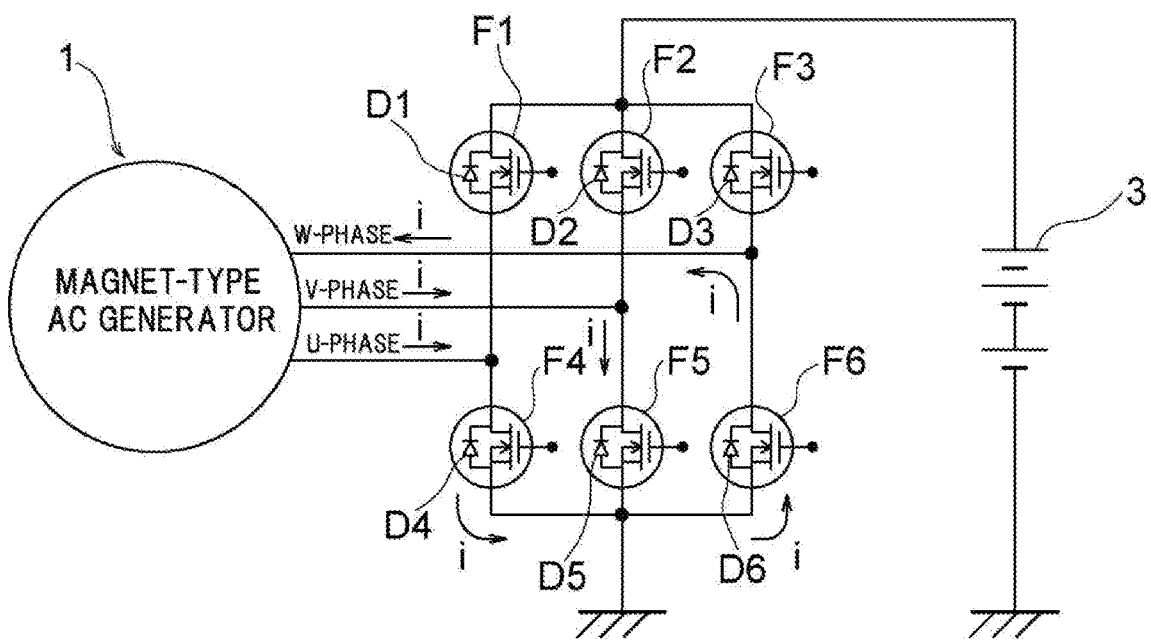
FIG. 4 is a circuit diagram for illustrating an action of the rectifier circuit when short-circuit control is performed in an embodiment of the present invention.

When short-circuit control is being performed, a short-circuiting current i flows through the three magneto coils and the MOSFETs F4-F6 of the lower arms of the rectifier circuit 2 as shown in FIG. 4, and the supply of a charging current to the battery 3 is stopped. The short-circuit control performed by the short-circuit control means 605 stops when the battery voltage falls to or below the prescribed voltage while short-circuit control is being performed, and during-charging FET control performed by the during-charging FET control means 604 is restarted. Thus, during-charging FET control and short-circuit control are repeated, whereby the battery voltage is kept near the prescribed voltage.

In the present embodiment, as shown in FIGS. 8(I) through (K), a FET OFF time period Δt is cyclically generated when short-circuit control is being performed; therefore, the ON/OFF states to be assumed by each of the MOSFETs F1-F6 constituting the rectifier circuit 2 at each instant of time in order to cause the MOSFETs F1-F6 to perform the rectifying action are sought by reading the detected output of the input potential polarity detection circuit 5 during the FET OFF time periods Δt and referencing the table of FIG. 11. The ON/OFF states of the MOSFETs F1-F6 sought during the FET OFF time periods Δt in the procedure in which short-circuit control is performed are stored in an ON/OFF state storage means (not shown). The ON/OFF states of the MOSFETs F1-F6 stored in the ON/OFF state storage means are updated every time new ON/OFF states are sought during the FET OFF time periods.

As described above, when the ON/OFF states to be assumed by each of the MOSFETs F1-F6 constituting the rectifier circuit 2 at each instant of time in order to cause the MOSFETs F1-F6 to perform the rectifying action are at any time sought also while short-circuit control is being performed, during-charging FET control can be quickly restarted after short-circuit control has been ended. Therefore, in the procedure of transitioning from short-circuit control to during-charging FET control, the heat generated by the parasitic diodes of the MOSFETs constituting the rectifier circuit can be reduced, and the temperature of the rectifier circuit can be prevented from excessively rising when short-circuit control is repeatedly performed.

As described above, when short-circuit control and FET OFF time periods Δt in which all of the MOSFETs F1-F6 of the rectifier circuit 2 assume an OFF state are cyclically generated, during the FET OFF time periods Δt, power is outputted from the generator 1 through the full-wave rectifier circuit configured from the parasitic diodes D1-D6 of the MOSFETs F1-F6 constituting the rectifier circuit 2. Because the FET OFF time periods Δt repeatedly occur while short-circuit control is being performed, when the battery 3 is charged by the power outputted from the rectifier circuit 2 for the FET OFF time periods Δt, there is a risk that the battery will assume an overcharged state.

Therefore, when the present invention is carried out, the length of the FET OFF time period Δt is preferably set such that a power amount [Ws] outputted at each unit time from the generator 1 through the full-wave rectifier circuit composed of the parasitic diodes D1-D6 of the MOSFETs F1-F6 constituting the rectifier circuit 2 while short-circuit control is being performed is kept to or below a minimum value of the power amount [Ws] which must be supplied from the battery to the load at each unit time.

While short-circuit control is being performed, when the FET OFF time period Δt is set so that the power amount [Ws] outputted at each unit time from the generator 1 through the parasitic diodes D1-D6 is kept to or below the minimum value of the power amount [Ws] which must be supplied from the battery 3 to the load 9 at each unit time, all of the power outputted from the generator 1 through the rectifier circuit configured from the parasitic diodes D1-D6 is supplied to the load 9 of the battery 3 during the FET OFF time period Δt, there are no instances of power being supplied from the rectifier circuit 2 to the battery 3, and the risk of the battery being brought to an overcharged state can therefore be eliminated.

When the FET OFF time period Δt is too short, the polarity of the potential of the input terminals of the rectifier circuit can no longer be appropriately detected, the ON/OFF states to be assumed by the MOSFETs F1-F6 at each instant of time can no longer be appropriately established; therefore, when the FET OFF time period Δt is fixed, it must be set so that the length thereof is not too short.

The minimum value of the power amount that must be supplied from the battery 3 to the load 9 is, for example, a minimum value of the power amount consumed by the load which is absolutely essential to activate the machine in which the battery 3 is installed.

When the machine in which the battery 3 is installed is a machine driven by an engine, such as a vehicle driven by an engine or an engine generator, minimum value of the power amount that must be supplied from the battery 3 to the load 9 is, for example, a power amount needed to drive an injector, a fuel pump, an ignition device, and other electric components needed to activate the engine when the engine is idling.

In the case of charging a battery 3 of which the load is electric components needed to activate an engine, the length of the FET OFF time period Δt can be set to, for example, about 10 μsec.

Figure 9:
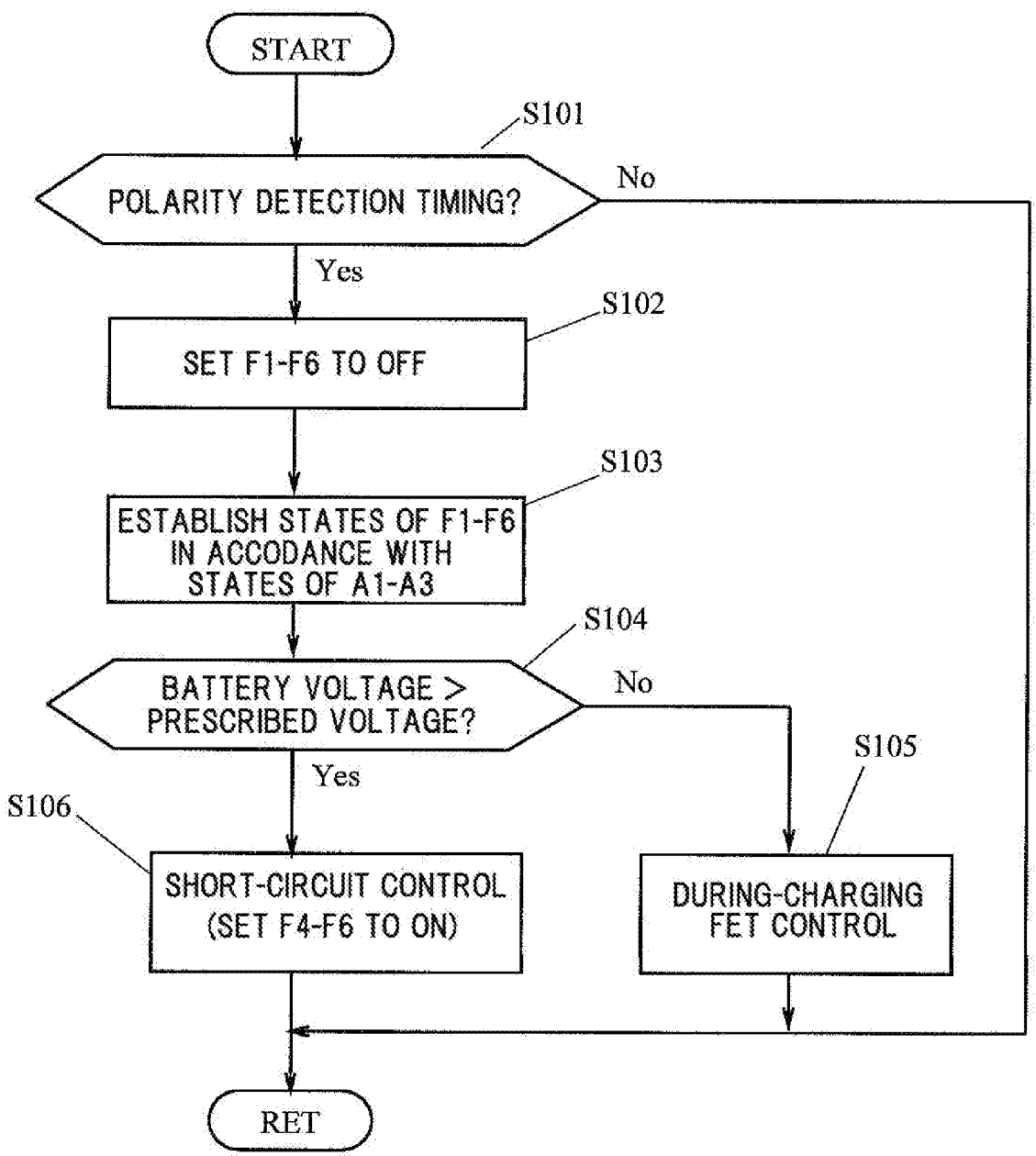
FIG. 9 is a flowchart showing an example of an algorithm for a program executed by a microprocessor in order to configure a FET control unit used in an embodiment of the present invention.

FIG. 9 shows one example of an algorithm of the process repeatedly executed by the microprocessor in extremely small increments of time in order to configure the charging necessity determination means 602, the ON/OFF state establishment means 603, the during-charging FET control means 604, the short-circuit control means 605, and the FET OFF means 606, in the case of the FET OFF time period being generated in a fixed cycle both when during-charging FET control is performed and when short-circuit control is performed as described above. In the process shown in FIG. 9, the FET OFF time periods are time periods that started at the sampling timings and that end upon completion of the ON/OFF state establishment process for establishing the ON/OFF states of the MOSFETs F1-F6 of the rectifier circuit.

When the process shown in FIG. 9 is started, first a determination is made in step S101 as to whether or not the current execution timing of this process is a timing at which the polarity of the potential of the input terminals of the rectifier circuit is detected (a sampling timing). As a result, when the current execution timing is determined to not be a timing at which the polarity of the potential of the input terminals of the rectifier circuit is detected, nothing is done thereafter and the process is ended. When the current execution timing is determined in step S101 to be a timing at which the polarity of the potential of the input terminals of the rectifier circuit is detected, a FET OFF command is sent to the FET drive circuit 607 in step S102, and the supply of a drive signal to all of the MOSFETs F1-F6 is stopped. The FET OFF means 606 is configured through step S102.

After the supply of the drive signal to the MOSFETs F1-F6 is stopped in Step 102, the process advances to step S103, and in accordance with the value of the binary signal sent to the ports A1-A3, the ON/OFF states to be assumed by the MOSFETs F1-F6 are established by searching the table of FIG. 11. The ON/OFF state establishment means 603 is configured through this step.

The process then advances to step S104 and a determination is made as to whether or not the sampled battery voltage exceeds the prescribed voltage. As a result, when the battery voltage is determined to not exceed the prescribed voltage, the process advances to step S105 and during-charging FET control is performed by sending a drive signal from the FET drive circuit 607 to designated MOSFETs of the rectifier circuit so that the states of the MOSFETs F1-F6 are matched with the states established in step S103. The during-charging FET control means is configured through step S105.

When the battery voltage is determined in step S104 to exceed the prescribed voltage, the process advances to step S106, and short-circuit control is performed by simultaneously sending a drive signal from the FET drive circuit 607 to the MOSFETs F4-F6 and simultaneously setting the MOSFETs F4-F6 to an ON state. The short-circuit control means 605 is configured through step S106.

In the above description, short-circuit control is performed by setting the MOSFETs F1-F3 of all of the upper arms of the rectifier circuit 2 to an OFF state and simultaneously setting the MOSFETs F4-F6 of all of the lower arms to an ON state, but short-circuit control may also be performed by simultaneously setting the MOSFETs F1-F3 of all of the upper arms of the rectifier circuit 2 to an ON state.

In the case using the algorithm shown in FIG. 9, the FET OFF time period is started at the sampling timings and ended at the point when the ON/OFF state establishment process is complete.

Other Embodiments

Figure 10:
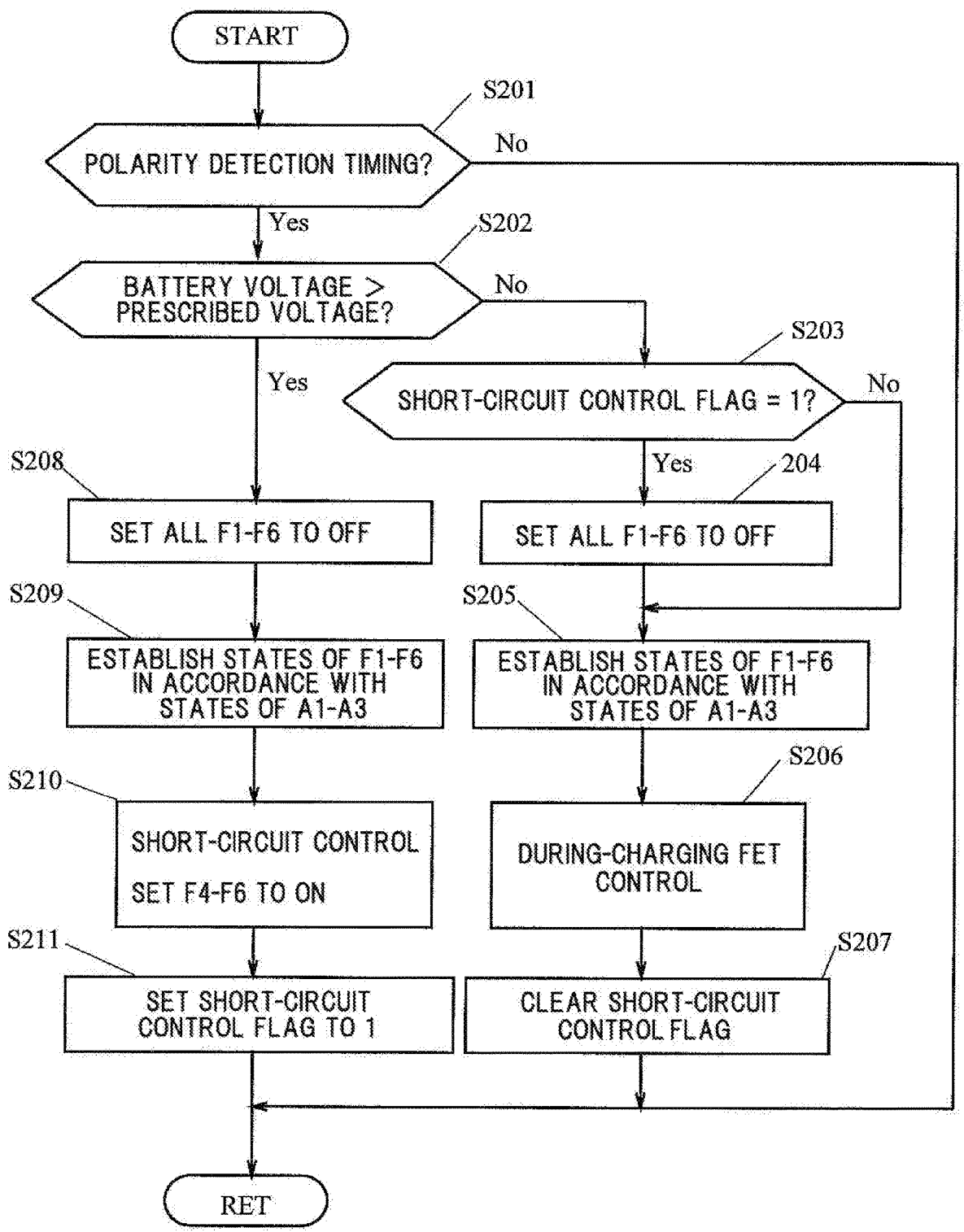
FIG. 10 is a flowchart showing another example of an algorithm for a program executed by a microprocessor in order to configure a FET control unit used in an embodiment of the present invention.

In the above embodiment, the FET OFF time period is generated in cycles both when during-charging FET control is performed and when short-circuit control is performed, but in another embodiment of the present invention, the FET OFF time period is generated only when during short-circuit control is performed. FIG. 10 shows an example of an algorithm of the process repeatedly executed by the microprocessor in extremely small increments of time in order to configure the charging necessity determination means 602, the ON/OFF state establishment means 603, the during-charging FET control means 604, the short-circuit control means 605, and the FET OFF means 606, in the case of such a configuration.

When the process shown in FIG. 10 is started, first a determination is made in step S201 as to whether or not the current execution timing of this process is a timing at which the polarity of the potential of the input terminals of the rectifier circuit is detected. As a result, when the current timing is determined to not be a timing at which the polarity of the potential of the input terminals of the rectifier circuit is detected, nothing is done thereafter and the process is ended.

When the current timing is determined in step S201 to be a timing at which the polarity of the potential of the input terminals of the rectifier circuit is detected, a determination is made in step S202 as to whether or not the sampled battery voltage exceeds the prescribed voltage. As a result, when the battery voltage is determined to be equal to or less than the prescribed voltage, the process advances to step S203 and a determination is made as to whether or not a short-circuit control flag is set to 1. The short-circuit control flag is a flag set to 1 when short-circuit control is to be started, and this flag is set to 1 in step S211 when the battery voltage is determined to exceed the prescribed voltage.

When the battery voltage is determined in step S202 to be equal to or less than the prescribed voltage and the short-circuit control flag is determined to not be set to 1 in step S203 (when the battery needs to be charged), the process advances to step S205, the ON/OFF states to be assumed by the MOSFETs F1-F6 are established by searching the table of FIG. 11 in accordance with the value of the binary signal sent to the ports A1-A3, after which the process advances to step S206 and during-charging FET control is then performed by sending a drive signal from the FET drive circuit 607 to designated MOSFETs of the rectifier circuit so as to match the states of the MOSFETs F1-F6 with the states established in step S205. The short-circuit control flag is then cleared in step S207 and this process is ended.

When the battery voltage is determined to exceed the prescribed voltage in step S202, a FET OFF command is sent to the FET drive circuit 607 in step S208, and the supply of a drive signal to all of the MOSFETs F1-F6 is stopped. Then, in step S209, the ON/OFF states to be assumed by the MOSFETs F1-F6 are established by searching the table of FIG. 11 in accordance with the value of the binary signal sent to the ports A1-A3, after which short-circuit control is performed in step 210 by simultaneously sending a drive signal from the FET drive circuit 607 to the MOSFETs F4-F6 and simultaneously setting the MOSFETs F4-F6 to an ON state. The short-circuit control flag is then set to 1 in step S211 and the process is ended. While the state continues in which the battery voltage is determined in step S202 to exceed the prescribed voltage, steps S208 to S211 are executed and short-circuit control is performed.

When the battery voltage is determined in step S202 to be equal to or less than the prescribed voltage while short-circuit control is being performed, the short-circuit control flag is determined in step S203 to be set to 1, a FET OFF command is therefore sent to the FET drive circuit 607 in step S204, and the supply of a drive signal to all of the MOSFETs F1-F6 is stopped, after which the process advances to step S205 and the ON/OF states to be assumed by the MOSFETs F1-F6 are established in accordance with the value of the binary signal sent to the ports A1-A3. The process then advances to step S206, during-charging FET control is performed by sending a drive signal from the FET drive circuit 607 to designated MOSFETs of the rectifier circuit so as to match the states of the MOSFETs F1-F6 with the states established in step S205, and the short-circuit control flag is then cleared to 0 in step S207.

When the process of FIG. 10 is executed with the short-circuit control flag having been cleared and the battery voltage is determined in step S202 to be equal to or less than the prescribed voltage, the short-circuit control flag is determined in step S203 to not be set to 1; therefore, steps S205 to S207 are executed and during-charging FET control is performed without step 204 being executed. Therefore, FET OFF control is executed only during short-circuit control and is not executed when during-charging battery control is performed.

In the case of the algorithm shown in FIG. 10, the charging necessity determination means 602 is configured through step S202, and the FET OFF means is configured through steps S204 and S208. The ON/OFF state establishment means 603 is configured through step S205 and S209, and the during-charging FET control means 604 and the short-circuit control means 605 are configured respectively through step S206 and S210.

When the means of the FET control unit are configured through the process shown in FIG. 9 or 10, the FET OFF means is configured so as to start the FET OFF time period in a fixed cycle and end the FET OFF time period at the point when the ON/OFF state establishment process is complete. When the FET OFF means is configured in this manner, the risk of the battery being overcharged during short-circuit control can be eliminated because the FET OFF time period is a minimum necessary length.

The process shown in FIGS. 9 and 10 is repeatedly executed in short time intervals, but the process shown in FIGS. 9 and 10 can also be an interruption process executed every time the sampling timing generation means generates a sampling timing. In this case, step S101 shown in FIG. 9 and step S201 shown in FIG. 10 are omitted.

Figure 5:
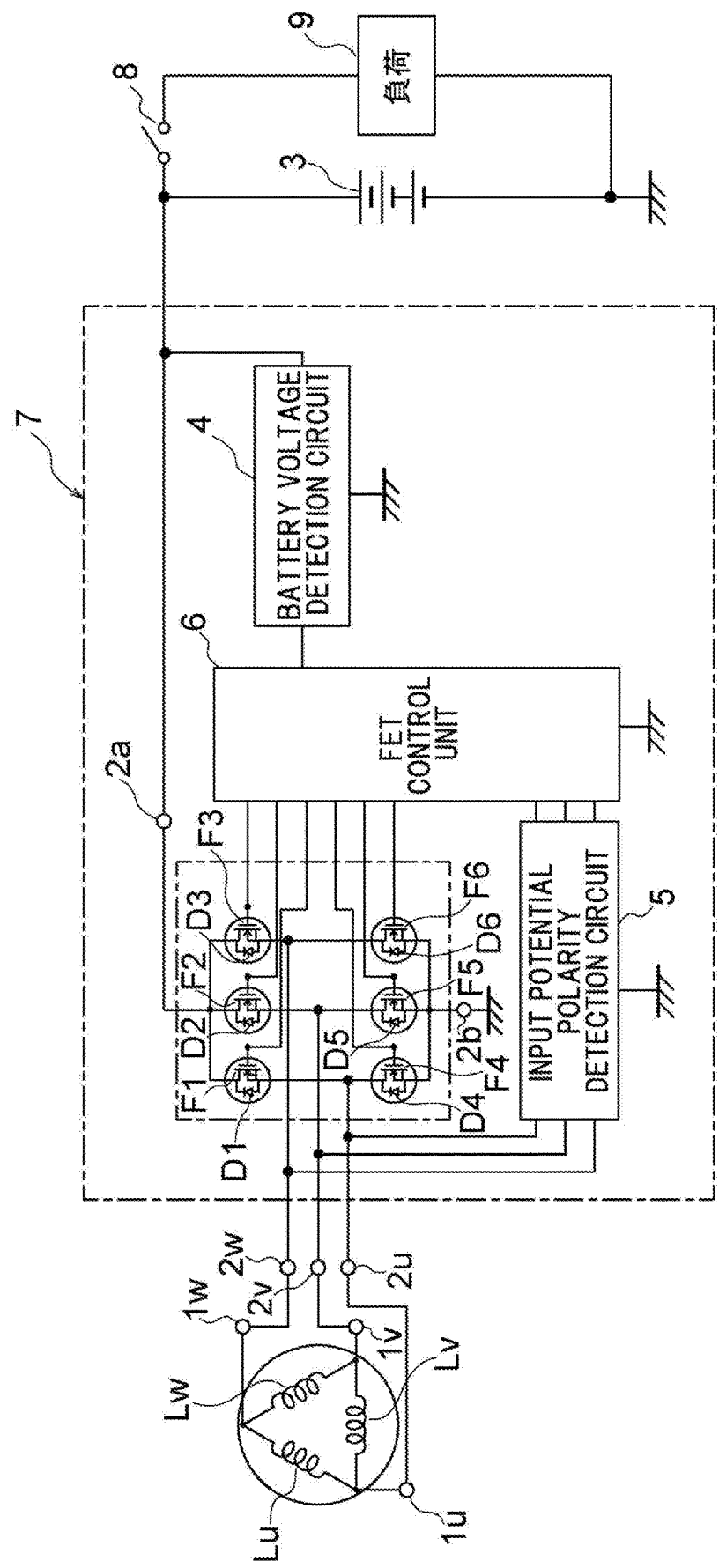
FIG. 5 is a circuit diagram of a configuration of another embodiment of the present invention.

In the example shown in FIG. 1, the three magneto coils Lu-Lw of the magnet-type AC generator 1 are connected in a star formation, but as is also apparent, it is also possible to use a magnet-type AC generator in which the three magneto coils Lu-Lw are connected in a triangle formation as shown in FIG. 5.

In the above embodiments, a generator that generates a three-phase AC voltage was used as the magnet-type AC generator, but the present invention can of course also be applied to cases of using a magnet-type AC generator that generates a single-phase AC voltage.

Embodiments of the present invention were described above, but the configurations of these embodiments are not provided by way of limitation on the present invention; various modifications can of course be made to each component within a range that does not deviate from the technical range set forth in the claims.

INDUSTRIAL APPLICABILITY

The battery-charging device according to the present invention can be widely utilized in technical fields in which a magnet-type AC generator driven by an engine, a windmill, a water wheel, or another motive power source must be used as a power source to charge a battery.

EXPLANATION OF NUMERALS AND CHARACTERS

1 Magnet-type AC generator
1u-1w Output terminals of generator
Lu-Lw Magneto coils of generator
2 Rectifier circuit
2u-2w Input terminals of rectifier circuit
F1-F6 MOSFETs
D1-D6 Parasitic diodes
3 Battery
4 Battery voltage detection circuit
5 Input potential polarity detection circuit
6 FET control unit
601 Sampling timing generation means
602 Charging necessity determination means
603 ON/OFF state establishment means
604 During-charging FET control means
605 Short-circuit control means
606 FET OFF means
607 FET drive circuit
9 Load of battery

The invention claimed is:

1. A battery-charging device that charges a battery by using a rectified output of a magnet-type AC generator, comprising
a full-bridge rectifier circuit which comprises a bridge circuit having upper arms and lower arms, each of the upper and lower arms constituting the bridge circuit being composed of a MOSFET, and the rectifier circuit further comprising input terminals to which an output of the generator is inputted, and the rectifier circuit further comprising a positive-side output terminal and a negative-side output terminal connected respectively to a positive terminal and a negative terminal of the battery,
a battery voltage detection circuit that detects a voltage between the positive terminal and the negative terminal of the battery,
an input potential polarity detection circuit that detects a polarity of a potential of each input terminal of the rectifier circuit, and
a FET control unit that controls the MOSFETs of the rectifier circuit in accordance with an output of the battery voltage detection circuit and an output of the input potential polarity detection circuit; wherein
the FET control unit is provided with a charging necessity determination means that determines whether the battery needs to be charged or battery charging needs to be paused based on the voltage detected by the battery voltage detection circuit; an ON/OFF state establishment means that performs an ON/OFF state establishment process based on the polarity of the potential of each of the input terminals detected by the input potential polarity detection circuit, establishes whether a state to be taken by each of the MOSFETs of the rectifier circuit is an ON state or an OFF state when the output of the generator is rectified and supplied to the battery; a during-charging FET control means that performs during-charging FET control, which controls the state of each MOSFET of the rectifier circuit so as to match the state to be taken established by the ON/OFF state establishment means when the charging necessity determination means has determined that the battery needs to be charged; a short-circuit control means that performs short-circuit control, which simultaneously sets the MOSFETs constituting all of the upper arms of the rectifier circuit to an ON state or simultaneously sets the MOSFETs constituting all of the lower arms of the rectifier circuit to an ON state to cause short-circuiting between output terminals of the generator when the charging necessity determination means has determined that battery charging needs to be paused; and a FET OFF means that causes a FET OFF time period in which all of the MOSFETs of the rectifier circuit are an OFF state to be generated in a set cycle at least when short-circuit control is performed; and
the ON/OFF state establishment means is configured so as to perform the ON/OFF state establishment process based on the polarity of the potential of each input terminal of the rectifier circuit detected by the input potential polarity detection circuit during the FET OFF time period, also while the short-circuit control means is performing short-circuit control.

2. The battery-charging device of claim 1, wherein
the battery-charging device is provided with a sampling timing generation means that generates a sampling timing in a fixed cycle; and the charging necessity determination means is configured so as to sample the voltage detected by the battery voltage detection circuit only at sampling timings generated by the sampling timing generation means, and determine whether the battery needs to be charged or battery charging needs to be paused based on the sampled voltage.

3. The battery-charging device of claim 2, wherein the FET OFF means is configured so as to generate the FET OFF time period every time the sampling timing generation means generates the sampling timing.

4. The battery-charging device of claim 1, wherein the FET OFF means is configured so as to generate the FET OFF time period in a set cycle even while the during-charging FET control is performed.

5. The battery-charging device of claim 1, characterized in that a length of the FET OFF time period is set such that a power amount outputted at each unit time from the generator through parasitic diodes of the MOSFETs constituting the rectifier circuit while the short-circuit control is being performed is kept to or below a minimum value of the power amount which the battery must supply to a load at each unit time.

6. The battery-charging device of claim 5, wherein the load to which the battery supplies power includes a load essential to activating a machine in which the battery is installed.

7. The battery-charging device of claim 6, wherein the machine in which the battery is installed is a machine driven by an engine, and the load to which the battery supplies power is an electric component needed to activate the engine.

8. The battery-charging device of claim 2, wherein the FET OFF means is configured so as to start the FET OFF time period in a fixed cycle and to end the FET OFF time period when the ON/OFF state establishment means completes the ON/OFF state establishment process.

9. The battery-charging device of claim 1, wherein
the upper arm and the lower arm connected to each input terminal of the rectifier circuit are respectively composed of an upper MOSFET of which a drain is connected to the positive-side output terminal and a source is connected to each input terminal, and a lower MOSFET of which a source is connected to the negative-side output terminal and a drain is connected to each input terminal; and the ON/OFF state establishment means is configured so as to establish the state to be taken by the MOSFET of the upper arm and the MOSFET of the lower arm connected to each input terminal of the rectifier circuit as ON state and OFF state, respectively, when the polarity of the potential of each input terminal detected by the input potential polarity detection circuit is a potential that applies a forward voltage to a parasitic diode of the MOSFET of the upper arm connected to each input terminal, and to establish the state to be taken by the MOSFET of the upper arm and the MOSFET of the lower arm connected to each input terminal of the rectifier circuit as OFF state and ON state, respectively, when the polarity of the potential of each input terminal detected by the input potential polarity detection circuit is a potential that applies a reverse voltage to the parasitic diode of the MOSFET of the upper arm connected to each input terminal.

10. The battery-charging device of claim 1, wherein the input potential polarity detection circuit has a polarity detection switch provided for each input terminal of the rectifier circuit, the polarity detection switch being provided so as to make an ON/OFF state different between times when the polarity of the potential of each input terminal of the rectifier circuit is positive and times when the polarity of the potential of each input terminal of the rectifier circuit is negative; and the FET control unit is configured so as to detect the polarity of the potential of each input terminal of the rectifier circuit from the state of the polarity detection switch provided for each input terminal of the rectifier circuit.

* * * * *

UNITED STATES PATENT AND TRADEMARK OFFICE
CERTIFICATE OF CORRECTION

PATENT NO. : 11,476,697 B2
APPLICATION NO. : 16/765065
DATED : October 18, 2022
INVENTOR(S) : Hirofumi Yamaguchi et al.

It is certified that error appears in the above-identified patent and that said Letters Patent is hereby corrected as shown below:

In the Specification

Column 15; Line 58:
"inter alfa, maintains" should be --inter alia, maintains--

Signed and Sealed this
Twenty-seventh Day of June, 2023

Katherine Kelly Vidal
*Director of the United States Patent and Trademark Office*